March 18, 1930.  J. VONS  1,750,947
SIGNAL LIGHT REFLECTOR AND MOUNTING THEREFOR
Filed Dec. 31, 1927  2 Sheets-Sheet 1
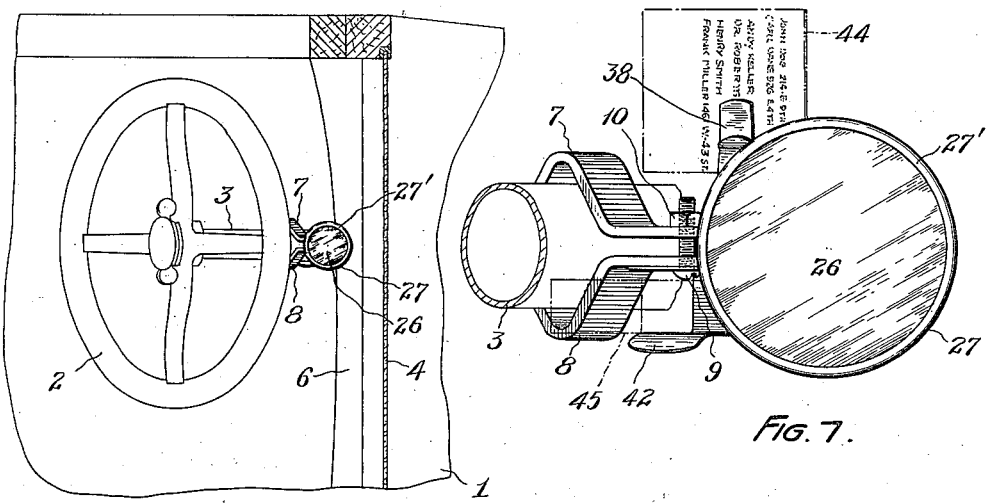
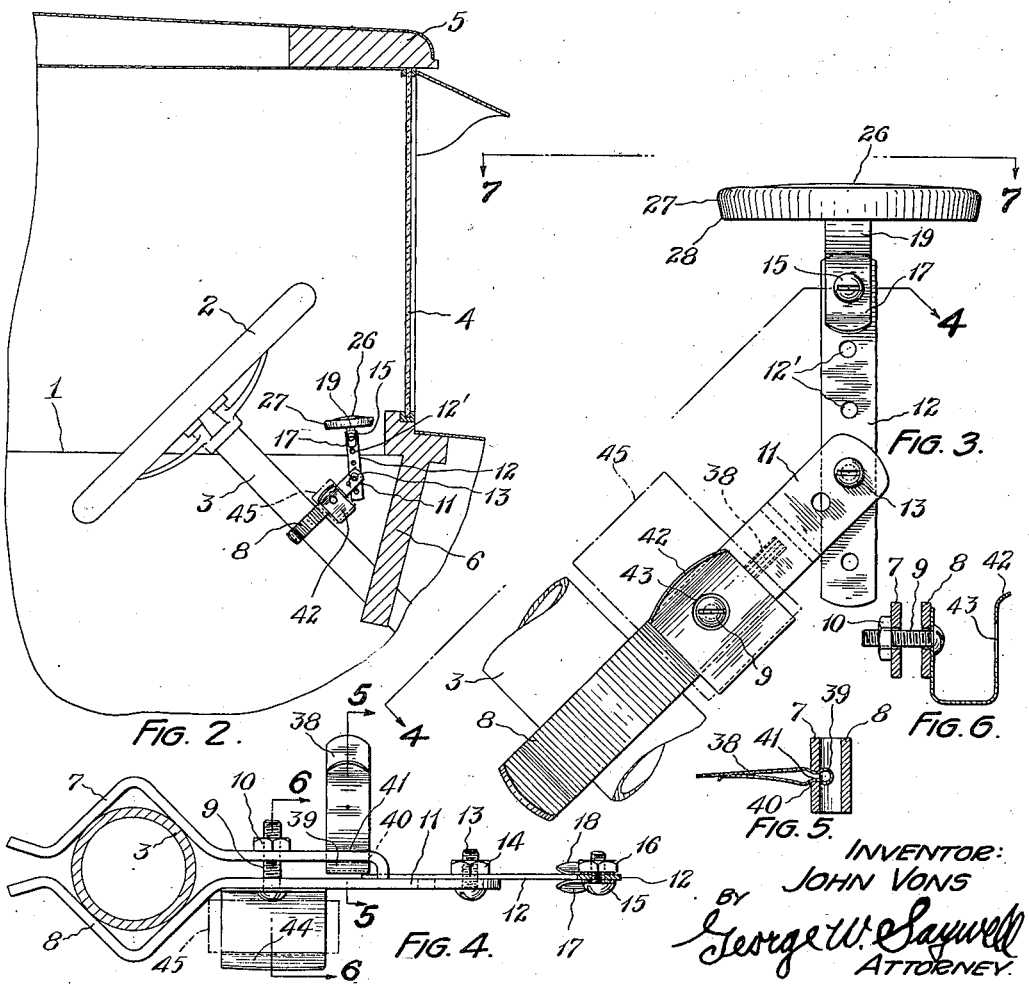
INVENTOR:
JOHN VONS
BY George W. Saywell
ATTORNEY March 18, 1930.  J. VONS  1,750,947
SIGNAL LIGHT REFLECTOR AND MOUNTING THEREFOR
Filed Dec. 31, 1927   2 Sheets-Sheet 2

INVENTOR:
JOHN VONS
BY George W. Saywell
ATTORNEY.

Patented Mar. 18, 1930

1,750,947

UNITED STATES PATENT OFFICE

JOHN VONS, OF CLEVELAND, OHIO

SIGNAL-LIGHT REFLECTOR AND MOUNTING THEREFOR

Application filed December 31, 1927. Serial No. 243,830.

This invention particularly relates to apparatus of the described character adapted to reflect the light rays from overhead automatic signal lights designed to direct automobile drivers. The purpose of the invention is to enable such drivers to obey the signals without the necessity of changing their natural driving position or craning their necks forwardly and below the automobile visor or outwardly through the car door, when the automobile body prevents the signal light from being seen from the natural driving position. The invention also relates to reflector mountings of general application.
The annexed drawings and the following description set forth in detail certain means embodying my invention, such means constituting, however, but a few of the forms in which the principle of the invention may be applied.

In said annexed drawings:

Figure 1 is a fragmentary top plan section of the closed body of an automobile, within which has been installed one of my improved reflectors, the latter being shown as mounted upon the steering post;

Figure 2 is a fragmentary side elevation and longitudinal vertical section of the automobile body and reflector shown in Figure 1;
Figure 3 is a view, upon an enlarged scale, of certain of the elements shown in Figure 2, particularly those relating to the mounting of the reflector;

Figure 4 is a view taken from the plane indicated by the line 4—4, Figure 3;

Figure 8:
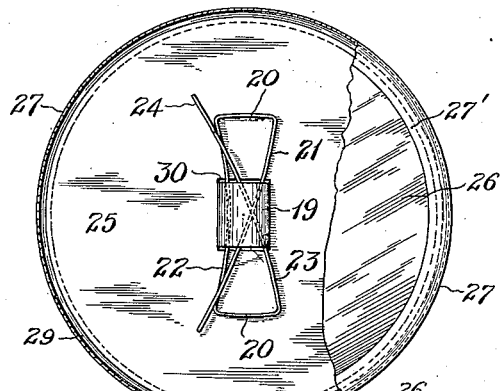
Figure 10:
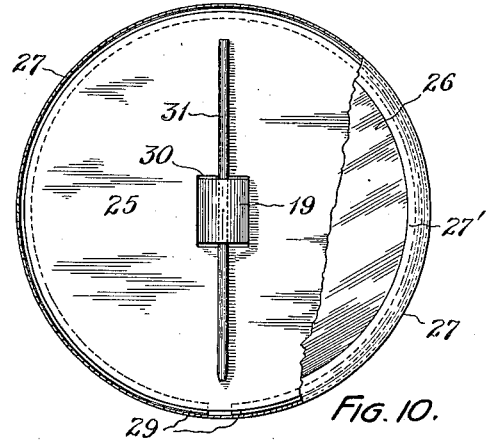
Figure 9:
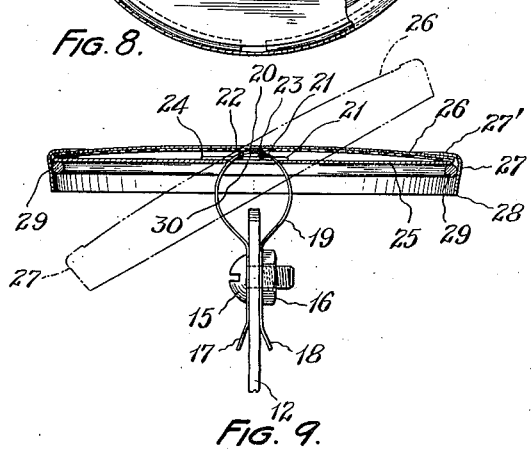

Figures 5 and 6 are sections taken in the planes indicated by the lines 5—5 and 6—6, respectively, Figure 4;

Figure 7 is a top plan, taken from the plane indicated by the line 7—7, Figure 3;

Figure 8 is a plan view, enlarged and partially broken away, of the reflector, showing also the means for holding together the several parts of the reflecting element;

Figure 9 is a vertical section of the elements shown in Figure 8, there being also shown in dot-and-dash lines one of the possible adjusted positions of the reflector element which can be adjusted through a rather wide range of positions by a rolling movement upon its support;

Figure 10 is a view similar to Figure 8, showing modified means for permitting the rolling adjustment of the reflecting element;

Figure 11:
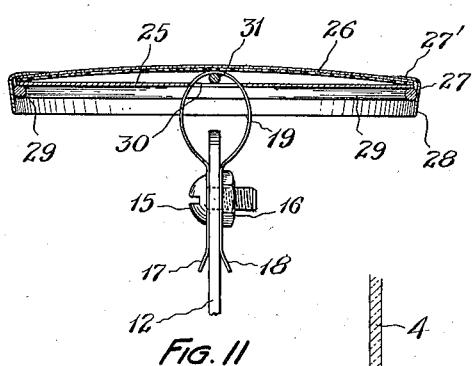
Figure 12:
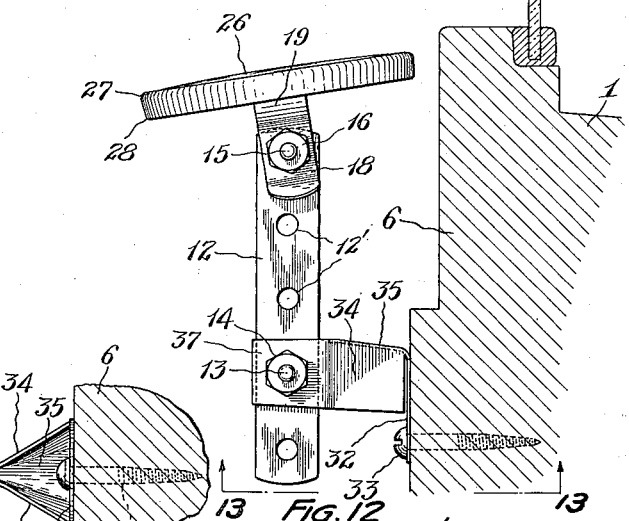

Figure 11 is a view similar to Figure 9, of the elements shown in Figure 10, the reflecting element being shown in normal horizontal position only;

Figure 12 is a partial vertical section of an automobile windshield and the adjacent instrument board and windshield support, showing in side elevation my improved reflecting element supported thereon by a modified form of supporting bracket;

Figures 13, 14:
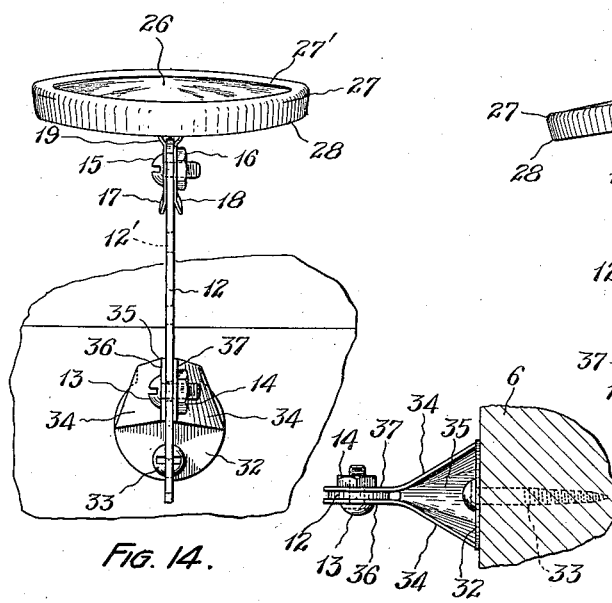

Figure 13 is a bottom plan view of the elements shown in Figure 12, taken from the plane indicated by the line 13—13, Figure 12; and Figure 14 is a front elevation of the elements shown in Figure 12.

Referring particularly to the annexed drawings in which the same parts are indicated by the same respective ordinals in the several views, an automobile body 1 having any standard form of steering wheel 2 mounted upon a steering post 3, and having a windshield 4, top 5, and instrument board 6, is provided with one form of my improved reflector and mounting secured to the steering post 3, Figures 1–7. Cooperative angular strap elements 7 and 8 form a clamp which is adapted to be releasably secured to the steering post 3 by means of a bolt 9 and nut 10. The clamp element 8 is formed with an extension 11 adapted to be releasably secured to an upright support 12 by means of a bolt 13 and a nut 14, the support 12 being tiltable in a vertical plane so as to permit its adjustment with relation to the clamp extension 11, the support 12 further being provided with a series of vertically alined holes 12' by means of which the support 12 can be mounted in the bracket 11 at different heights.

Secured to the support 12 adjacent the top end thereof by means of a bolt 15 and a nut 16 are the outwardly flared legs 17 and 18 depending from a curved enlarged upper body member 19, this entire member being of spring construction and the legs 17 and

18 of which are adapted to be brought into closely parallel relation with the support 12 secured therebetween by means of the bolt 15 and nut 16. Furthermore, the upper body member 19 of this spring element is substantially circular in vertical cross-section so that its inner upper face forms a rolling surface over which may be adjusted through a considerable range of play a reflector element whose detailed construction will be hereinafter fully described. Referring particularly to Figures 8 and 9, a spring wire is bent into substantially the bow-knot construction shown consisting of end portions 24, crossing portions 21 and 23, intermediate side portions 20 and central portion 22, and is disposed adjacent its middle portion beneath and in contact with the rolling surface formed upon the under face of the top part of the member 19. This latter member extends through a hole 30 formed in the base member 25 of the reflector element, end portions of the spring wire support being held against the solid part of the element 25, as plainly shown in Figure 8. This construction permits the element 25 and the related parts of the reflector member to be tilted with the bow-knot spring wire upon the top of the member 19, as and when desired, thus easily to permit the quick manual adjustment of the reflector element throughout a wide range of adjustment, this adjustment being a delicate one; in fact it may be a continuous adjustment. The reflector element as a whole comprises a rim member 27 having an upper inwardly-extended flange 27' beneath which flange is positioned a mirror 26, the reflector base 25 and the mirror 26 being held tightly against the flange 27' by means of a split-end copper ring 29 forced under tension into the rim 27 and held by tension against the inner face of said rim, the latter converging inwardly towards its bottom edge 28, all as plainly shown in Figure 9.

In Figure 11 I show a modified construction for holding the reflector base 25 to the circular support 19. I dispense with the bow-knot wire construction and substitute therefor a rod element 31 disposed beneath and in contact with the lower face of the upper portion of the support 19 and having its ends resting upon the body 25, as plainly shown in Figure 11. By this construction also the entire reflector element can be manually and quickly tilted through a continuous and considerable range of adjustment to permit the operator to pick up the lights of the overhead signal, irrespective of the position of said lights within the range of the adjustment of the mirror 26.

Referring particularly to Figures 12, 13 and 14, I show therein a construction of bracket permitting the support 12 and the reflector element mounted thereon to be conveniently and adjustably secured to the instrument board 6 or to the windshield base. A bracket body 32 is secured to the board 6 by means of a screw 33 and at its upper portion is bent at substantially a right angle into two side members 34 and an upper roof member 35 forming a shield construction, substantially as shown in Figure 13, the portions 34 converging outwardly so as to form extreme end portions 36 and 37 in close parallel alignment adapted to receive between them the reflector support 12 adjustably secured therein by means of the bolt 13 and nut 14. The particular reflecting element used in this form of device and the mounting of the same are similar to those described with reference to the preceding figures.

The mirror 26 has a convex reflecting surface and normally lies in a substantially horizontal position so as to catch and reflect overhead light rays, the convexity producing a better reflection than a plane surface as well as covering a field of light greater than would be possible in a perfectly plane surface. When unusually distant signal lights or those at an unusual lateral angle necessitate the positioning of the reflecting surface differently from that required by the usual comparatively near overhead light, then the support or the mirror or both can be adjusted in the manner hereinbefore described, the particular mounting shown in Figures 8 to 11 permitting a quick manual adjustment of the mirror for emergency or temporary purposes.

I use the strap elements 7 and 8 as supports for elements adapted to carry certain articles which many automobile operators desire to have conveniently at hand, such as calling cards, report slips, match boxes, etc. To this end, I have formed a slot 40 in the strap element 7 and secured therein by means of a bead 39 and an adjacent constricted neck portion 41 a resilient double-leafed member 38 forming a suitable holder for cards, report slips, etc. To the other strap element 8 I have secured a U-shaped holder member 42 by means of the bolt 9 and nut 10 which serve releasably to secure the strap elements 7 and 8 to the steering post 3, access to the screw slot in bolt 9 being afforded by the hole 43 formed in the outer arm of the U-shaped member 42. In Figure 4 a box of matches 45 are shown supported in the member 42 and in Figure 7 a report or trip card 44 is releasably supported in the holder 38.

As is well known, automobile signal lights ordinarily show green when the crossing is free and show red when the crossing is barred. Ordinarily and at certain recurrent intervals the light changes from one to the other or possibly passes through three or more stages of color. When the road ahead is barred, the driver ordinarily stops at the intersection which brings his car into position under the light or at least in such a position as to prevent his seeing the light from the natural driving position. This makes it necessary to lean forward and peer up through the windshield or lean out of the car and look overhead. This is very inconvenient and likewise interferes with the proper operation of the other car controls. By means of the reflector and mounting which have been described, the rays from the overhead signal are gathered by the mirror 26, when the latter is properly adjusted and when the car is in any position that it ordinarily would stop under the direction of such overhead lights. Thus the driver gets his information through the mirror 26 of the correct signal from his natural driving position, and instantly and conveniently learns whether and when the crossing is clear or barred.

What I claim is:

1. A signal-light reflector and mounting therefor comprising a bracket for mounting on a support, a supporting arm adjustably secured to said bracket, a double-leafed support secured to said arm and having an extended curved portion, a reflector element formed with a recess into which said curved portion extends, said curved portion having rolling contact with the reflector element, and means for retaining said curved portion and reflector element in contact.

2. A signal-light reflector comprising a reflecting surface member, a backing member secured thereto and provided with an aperture, a bearing element between said members and a second bearing element extending through said recess and engaging said first-mentioned bearing element, one of said bearing elements being resilient.

3. A signal-light reflector comprising a reflecting surface member, a backing member secured thereto and provided with an aperture, a resilient expansible bearing element between said members and a second bearing element extending through said recess and having frictional engagement about said resilient bearing element.

4. A signal-light reflector comprising a reflecting surface member, a backing member secured thereto and provided with an aperture, a resilient expansible bearing member comprising a spring wire bent into substantially a bow-knot longer than said recess, and a resilient curved member extending through said recess and having frictional engagement about said bearing element.

5. A signal-light reflector adapted for mounting on a motor vehicle and comprising a reflecting member having a resiliently expansible bearing element within itself and a mounting including a resilient bearing portion extending within said reflecting member and having frictional engagement about said expansible bearing member for adjustable and steady support of the reflecting member.

Signed by me this 27th day of December, 1927.

JOHN VONS.